US00RE36599E

United States Patent [19]

De Guzman

[11] E Patent Number: Re. 36,599

[45] Reissued Date of Patent: Mar. 7, 2000

[54] MULTIPLE PURPOSE WRINGER AND METHOD OF WRINGING ARTICLES

[75] Inventor: Joselito De Guzman, Redondo Beach, Calif.

[73] Assignee: Micronova Manufacturing, Inc., Torrance, Calif.

[21] Appl. No.: 08/912,135

[22] Filed: Aug. 15, 1997

Related U.S. Patent Documents

Reissue of:

[64] Patent No.: 5,440,778
Issued: Aug. 15, 1995
Appl. No.: 08/316,179
Filed: Sep. 30, 1994

[51] Int. Cl.[7] ..... B30B 9/22; A47L 13/58

[52] U.S. Cl. ..... 100/37; 100/122; 100/211; 15/260; 68/242

[58] Field of Search ..... 15/260–263; 68/96, 68/242; 100/104, 110, 116, 122, 211, 297, 37, 123, 132, 212

[56] References Cited

U.S. PATENT DOCUMENTS

| | | | |
|---|---|---|---|
| 493,340 | 3/1893 | Prescott | 15/262 |
| 605,362 | 6/1898 | Trimble | 15/262 |
| 612,116 | 10/1898 | Marquis | 15/262 |
| 612,842 | 10/1898 | Griffith | 15/262 |
| 634,901 | 10/1899 | Monnig | 100/122 |
| 736,065 | 8/1903 | Burnham | 15/262 |
| 824,592 | 6/1906 | Schayer | 100/123 X |
| 1,569,360 | 1/1926 | Edwards | 15/104.04 |
| 1,605,330 | 11/1926 | Dorroh | 68/96 |
| 2,061,556 | 11/1936 | Blake | 15/262 |
| 2,099,217 | 11/1937 | Newland | 15/262 |
| 2,350,152 | 5/1944 | Dahlstrom | 100/123 X |
| 3,346,906 | 10/1967 | Harrison et al. | 15/262 |
| 3,707,740 | 1/1973 | Demers | 15/236.03 |
| 3,916,470 | 11/1975 | May | 15/98 |
| 5,090,084 | 2/1992 | De Guzman | 15/230.11 |

FOREIGN PATENT DOCUMENTS

| | | | |
|---|---|---|---|
| 25832 | 1/1969 | U.S.S.R. | 100/153 |
| 2990 | 2/1908 | United Kingdom | 15/262 |

*Primary Examiner*—Mark Spisich
*Attorney, Agent, or Firm*—Henricks, Slavin & Holmes, LLP

[57] ABSTRACT

An adjustable wringer can wring a variety of different types and sizes of mops, wipes, sponges and other wringable items for use in cleaning clean rooms. The wringer has two side plates situated in a spaced relationship relative to one another, each of the side plates having a slot. The wringer has a lever which has a handle and a rod. The handle has side posts, with the lower end of each side post being rotatably mounted to a respective side plate, and a handle bar extending across and connecting the upper ends of the first and second side posts. The rod is attached at each end to a handle side post, with each end of the rod passing through a respective slot in the side plates. The wringer also has a crank which has a crank handle and a rotatable crank shaft that extends from one side plate to the other. A substantially lint-free, flexible web is attached at one end to the rod and at the other end to the crank shaft. Once a wringable item has been placed in the wringer, the rod may be moved adjacent to the crankshaft. The crank handle may then be rotated to tighten the flexible web about the wringable item, thereby wringing the item. The wringer may additionally include low-friction bushings to replace the lubricating oils and greases typically found in wringers, thereby making the wringer suitable for sterilization in an autoclave.

50 Claims, 7 Drawing Sheets

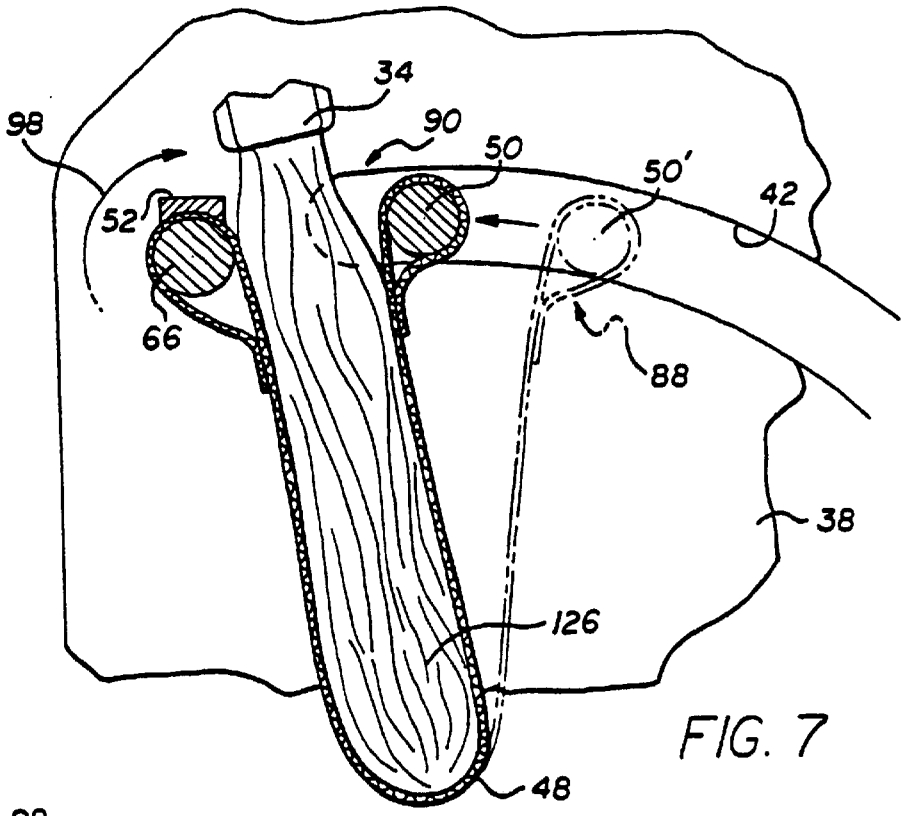
FIG. 7
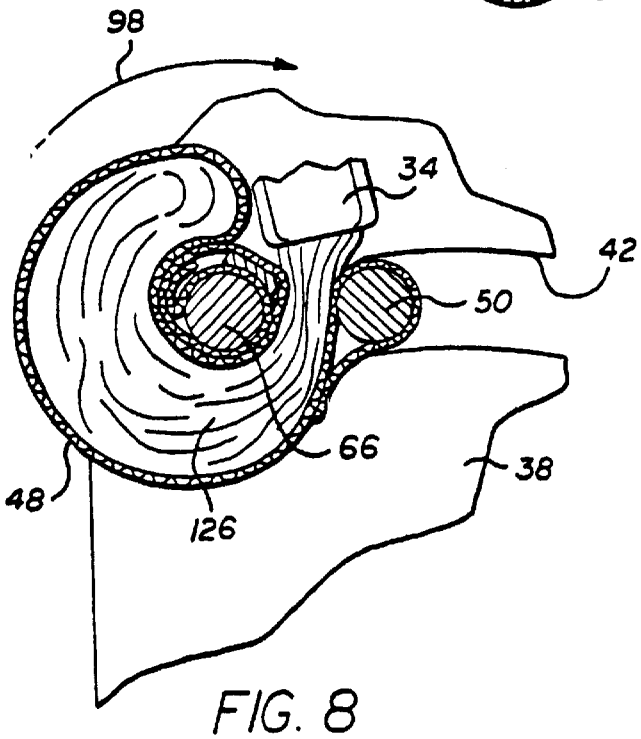
FIG. 8
FIG. 9
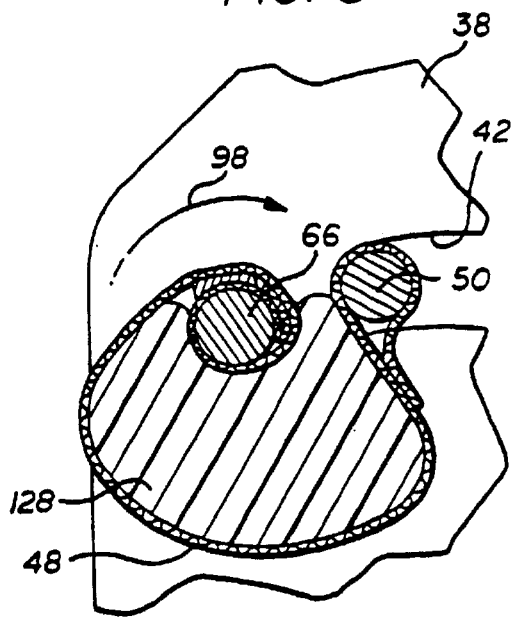

MULTIPLE PURPOSE WRINGER AND METHOD OF WRINGING ARTICLES

Matter enclosed in heavy brackets [ ] appears in the original patent but forms no part of this reissue specification; matter printed in italics indicates the additions made by reissue.

Background of the Invention

1. Field of the Invention

The present invention relates to wringers such as for use in clean rooms, and particularly to a versatile, wringer that can wring a variety of types and sizes of mops, wipes, sponges and other wringable materials.

2. Description of Related Art

Certain pharmaceuticals, electronics and other specialized goods must be manufactured in contamination-free "clean rooms" which are kept free from impurities such as dust and microorganisms. Similarly, hospitals maintain their operating rooms as "clean rooms", which must be kept free form microorganisms and dust particles, and all reusable items must be sterilized in high-heat autoclaves prior to reuse in the sterile environment of an operating room.

In typical procedures for maintaining the contamination-free environment of a clean room, cleaning crews that regularly mop and wipe the room use a bucket of cleaning solution, a mop and a wringer along with sponges. Sponges are usually rinsed and squeezed out by hand into the bucket of cleaning solution, while the mop is typically rinsed in the bucket and then wrung out with the wringer.

The most common type of wringer is the downward gear press wringer. The wringer uses levers, gears and springs for moving two parallel bars to converge downward, thereby applying a downward force along two line segments on the mop head. The wringer has a perforated pan at the bottom to permit drainage.

Standard wringers generally do not apply a uniform wringing pressure to a mop or other wringable items. For instance, the gear press wringer typically applies pressure only where the bars contact the mop. However, for a string mop, for example, or a flap mop, placed on the perforated pan of the wringer, the strings take whatever shape they can given the shape of the sides and bottom of the wringer, but the strings will not necessarily conform in every respect to the shape of the wringer. Thereafter, the rigid parallel bars of the wringer contact and press only those parts of the mop which are in contact with the sides of the wringer. However, for those parts of the string mop which may move or readjust during the process of wringing, such as by squeezing out the sides or moving toward the bottom of the wringer, the full wringing action may not be applied to those parts. Therefore, a uniform wringing of solution from the mop may not be achieved because of happenstance variations in the shape of the strings.

Typical wringers such as the gear press wringer are also limited in the number of different configurations of mops that can be accommodated in the wringer. A given wringer is typically designed for a certain type and size of mop and would not easily accommodate mops having other shapes and sizes. For example, a mop having a large, square sponge head may not fit easily into a wringer designed for small string mops. Even if a wringer could accept different types of mops, the performance of the wringer in extracting solvent is generally better for one type of mop than the others. Therefore, typical wringers are not very versatile.

Additionally, most wringers have a minimum item size because the gear press will only travel so far. Accordingly, the wringers will not clean small wipes or sponges.

Typical wringers are difficult to clean. Dirt particles get caught in the cracks and corners of the assembly, which must then be hosed down. If the wringer is not regularly cleaned, accumulating dust and dirt fall down into the cleaning solution and work their way back onto surfaces of the clean room.

A further problem with existing wringers is that some typically require lubricants for proper operation. Lubricants from the wringer may then end up in the cleaning solution and then the clean room. Moreover, wringers used to clean operating rooms must be sterilized in an autoclave. The moving parts of the wringer are normally coated with grease or oil to reduce friction. In the high heat environment of an autoclave, the grease and/or oil flows very easily and drips onto the autoclave and migrates from the area that needs the lubrication. The wringer then must be re-lubricated before it can be used again.

Grease and oil are problematic in other ways, such as getting into the cleaning solution and eventually onto the floor and walls of the clean room. Unfortunately, to eliminate the lubricant would allow moving metal parts such as shafts to grind against adjoining metal surfaces, creating metal particles which drop down into the cleaning solution and then into the clean room.

SUMMARY OF THE INVENTION

Broadly considered, an adjustable wringer in accordance with the present invention may wring a variety of different types and sizes of mops, wipes, sponges and other wringable items. The wringer has a flexible web with one portion on a first member, for example, and another portion on a second member. The wringer may have a first mode in which a wringable item may be loaded onto flexible web in between the first member and the second member. The wringer may also have a second mode in which the flexible web substantially envelopes and applies substantially uniform pressure to at least a major portion of the wringable item.

The present invention is helpful in overcoming the shortcomings of the prior art in a number of ways. First, the flexible web conforms to the shape of the wringable item, thereby accommodating a variety of types, shapes and sizes of wringable items. By conforming to the shape of the item, the flexible web evenly distributes wringing pressure on the item, thereby wringing a higher volume of water or solvent than conventional wringers.

Secondly, the versatile, flexible web can be adjusted to accommodate small items that could not be accommodated by other wringers.

Thirdly, the present invention is generally easy to clean. The number of openings, corners and shelves present for dirt to get caught on can be minimized.

In one preferred embodiment of the wringer, lubricants may be avoided by using "TEFLON" or other low-friction material. For example, embodiments of the present invention may incorporate bushings and/or other parts made in whole or part of "TEFLON", which minimizes or eliminates the need for lubricating oil or grease. There is then no oil or grease to contaminate the cleaning solution, and there is also no metal-to-metal contact to create contaminating particles. Furthermore, embodiments of the present invention which are free from oil and grease may be placed in an autoclave for sterilization before reuse.

Considering one embodiment of the present invention in more detail, the wringer may have one end of the web mounted to a movable bar, with one end of the movable bar passing through a slot in a first side support and the other end passing through a slot in a second side support. A crank with a crank handle and a rotatable crank shaft extends the first side support to the second side support for changing the web configuration.

The wringer may have a loading position in which the movable bar is spaced a distance from the crank shaft and in which a user may place a wringable item of any of a variety of different dimensions and configurations onto the flexible web. There may also be a wringing position in which the bar is relatively closer to the crank shaft and in which the flexible web substantially envelopes the wringable item. The movable bar may move along the slots from the loading position to the wringing position. In the wringing position, the user may rotate the crank handle to tighten the flexible web about the wringable item, thereby wringing the item, providing uniform pressure over the surface of the wringable item.

It may be noted that numerous variations to the above-described embodiments are possible. For instance, the crank shaft may be fixed on the frame. Alternatively, the bar may be fixed on the frame while the crank shaft is free to move relative to the bar. In yet another alternative, both the crank shaft and the bar may be free to move relative to one another. A handle may be attached to the moving member or members for user convenience.

Other objects, features, and advantages of the invention will become apparent from a consideration of the following detailed description and the accompanying drawings.

BRIEF DESCRIPTION OF THE DRAWINGS

FIG. 7 is a partial sectional view showing the head of a string mop inserted into the freely-hanging web of the wringer embodiment of FIG. 1;

FIG. 8 is a partial sectional view of the wringer section of FIG. 7 with the web and the mop strings deflected and squeezed about the crank shaft;

FIG. 9 is a partial cross-sectional view of the wringer of FIG. 1 wringing a sponge;

DETAILED DESCRIPTION OF THE PREFERRED EMBODIMENTS

The present invention of a multiple purpose wringer provides a versatile wringer which can wring a wide variety of types and sizes of mops, wipes, sponges and other wringable materials through a relatively simple mechanism which is easy to clean and minimizes any possible creation of secondary contaminants such as metal particles or lubricants.

Figure 1:
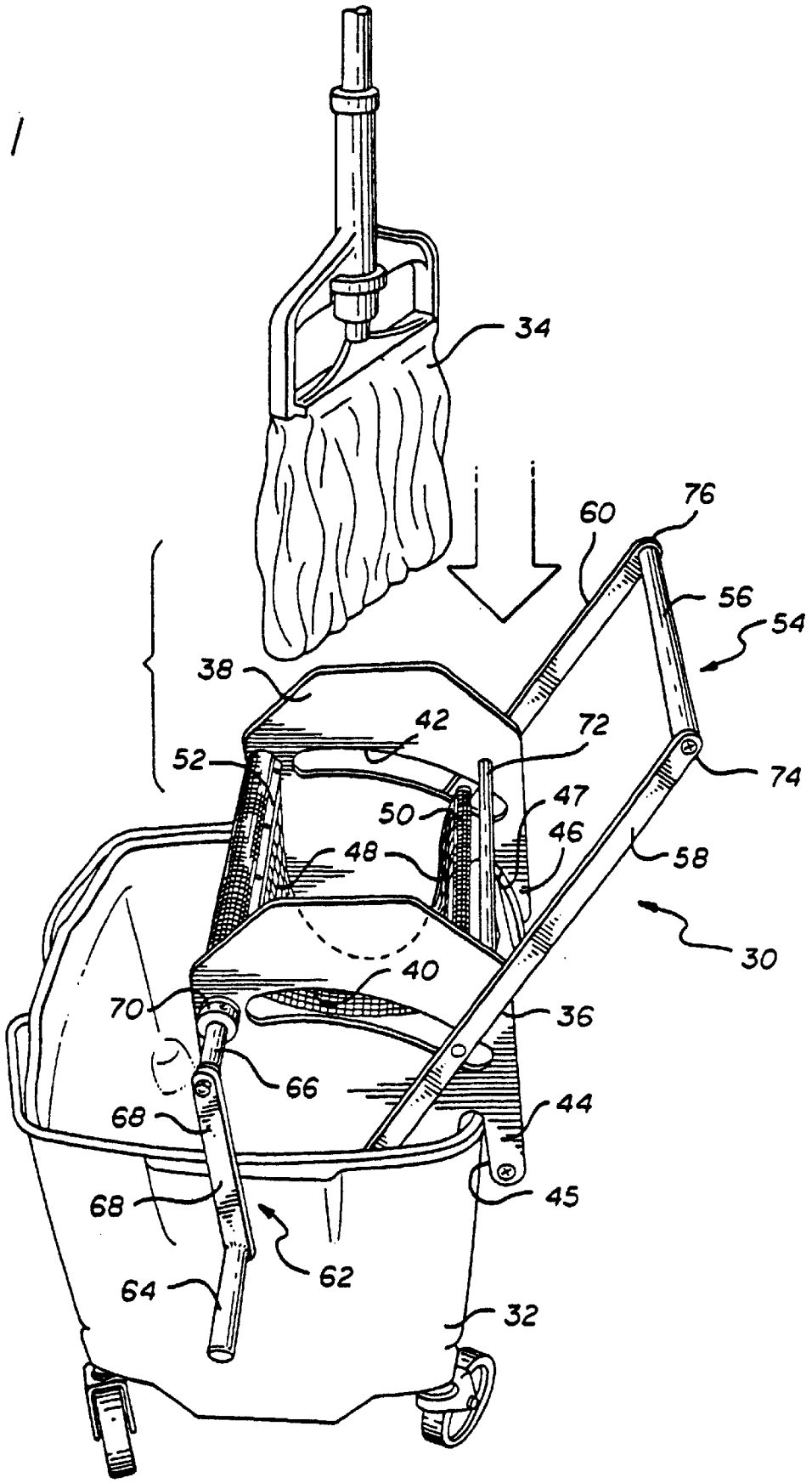
FIG. 1 is a side perspective view of a preferred embodiment of a wringer in an open position ready to receive a wringable item.

One preferred embodiment of a wringer 30 in accordance with the present invention is shown in FIG. 1 on a bucket 32. The wringer 30 is shown in an open position and is ready to receive a mop 34. The wringer in the preferred embodiment has first and second stainless steel side plates 36, 38 forming part of a frame for purposes of rigidity and stability which have side plate slots 40, 42 and first and second bucket mounts 44, 46. A web 48 is positioned in the frame so that the web can accept a wringable item and close around the wringable item so as to wring the item, preferably by applying uniform pressure over as much of the item as possible. Preferably, the web is originally in a relaxed state, such as that shown in FIG. 1, so that a mop or other wringable item may be placed on the web. The web is then reconfigured or moved So as to preferably close around, capture or apply pressure to the wringable so as to wring solvent, water or other solution from the item. In the preferred embodiment, the web 48 is a lint-free flexible polyester web and is looped on one end about movable rod 50 and is clamped on its other end to crank shaft 66 by clamp bar 52. In the open position of the web shown in FIG. 1, the opposite ends of the web 48 are spread a distance apart, allowing the rest of the web 48 to hang loosely in a concave shape. Also in the open position of FIG. 1, there is a wide, substantially unobstructed loading space in between crank shaft 66 and movable rod 50. Consequently, mop 34 may be loaded into the wringer 30 from above.

Other arrangements may be provided for supporting the flexible web 48. One such embodiment is discussed below in conjunction with FIG. 10. The use of a moveable rod and a rotatable shaft for supporting the ends of the web is particularly beneficial because of its simple construction, the maneuverability of the web about the wringable item, and the ability to take up the web about the rotatable shaft to effect the wringing action. There are relatively few moving parts for achieving the desired result.

Movable rod 50 is connected to lever assembly 54 for allowing the user to move the end of the web 48 on the movable rod 50 toward or away from the opposite end of the web on the rotatable crank shaft 66 to close or open the loading space for the mop. Specifically, movable rod 50 is connected at one end to a first lever side post 58 and is connected at its other end to second lever side post 60. In FIG. 1, movable rod 50 is connected to the side posts 58, 60 by screws. Lever assembly 54 also includes a lever handle 56 that is connected to and interposed in between the upper ends of the lever side posts 74, 76. One end portion of movable rod 50 passes through slot 40 of the first side plate 36, while the opposing end of movable rod 50 passes through slot 42 of the second side plate 38. First and second lever side posts 58, 60 are preferably situated on the exterior sides of first and second side plates 36, 38.

Wringer 30 also includes a crank 62 for changing the configuration of the web 48 to effect the desired wringing action. The crank includes a crank handle 64 that is welded to or otherwise connected to crank connecting bar 68, which in turn is mounted or attached to crank shaft 66. the crank shaft 66 passes through apertures (not shown) in both the first and second side plates 36, 38. Crank 62 includes a stainless steel collar 70 through which crank shaft 66 passes, and a glass-filled "TEFLON" bushing 78 (FIG. 3) interposed between stainless steel collar 70 and first side plate 36. The purpose of glass filled "TEFLON" bushing 78, and its counterpart 80 (FIG. 3) on the exterior side of second side plate 38 is to provide low-friction support for crank shaft 66. These "TEFLON" bushings take the place of lubricating greases and oils that may be found in conventional wringers. The stainless steel and "teflon" construction of wringer 30 is well suited for the high heat environment of the autoclaves that are typically used to sterilize items prior to reuse in an operating room.

Figure 2:
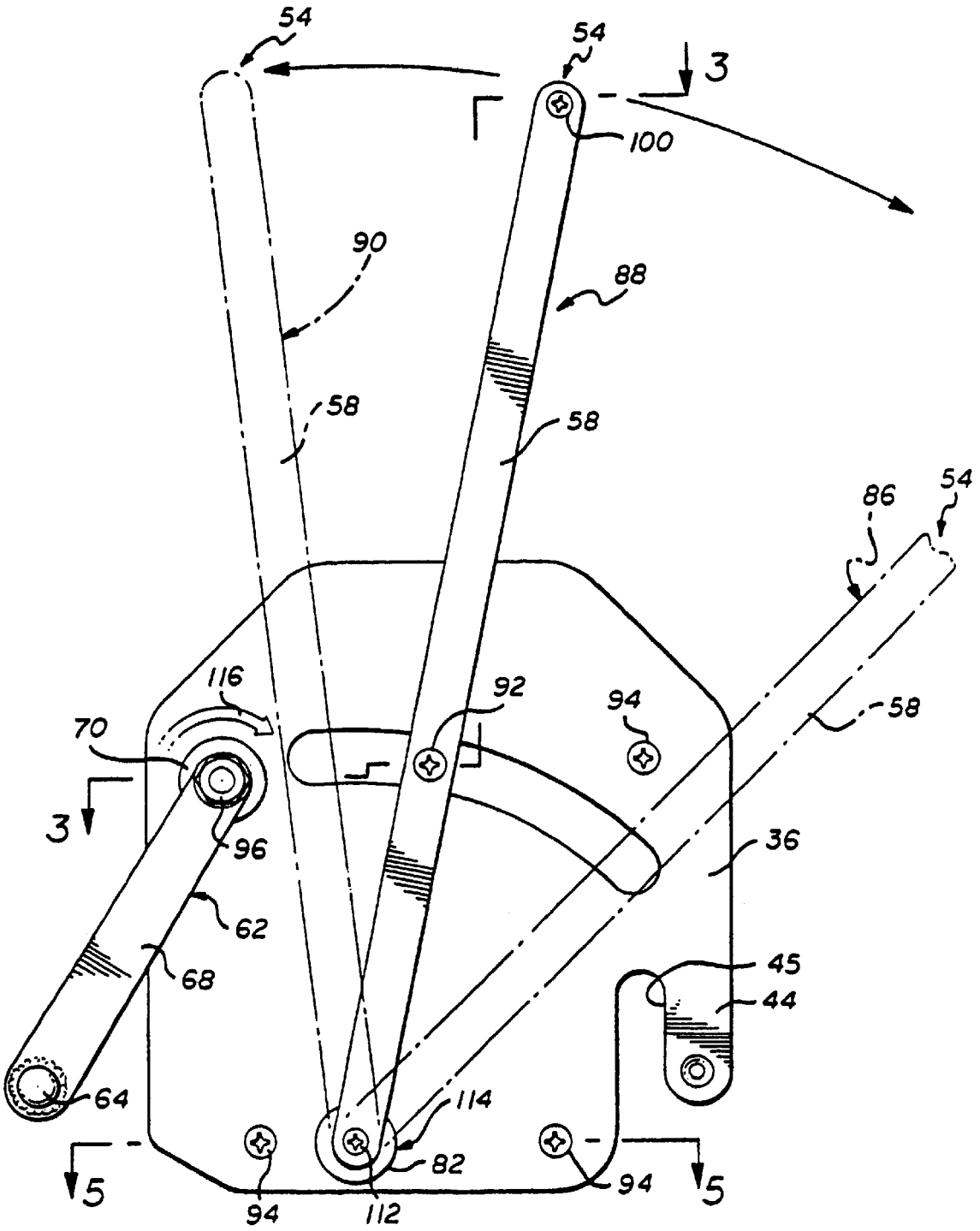
FIG. 2 is a side view of the wringer of FIG. 1.
Figure 6:
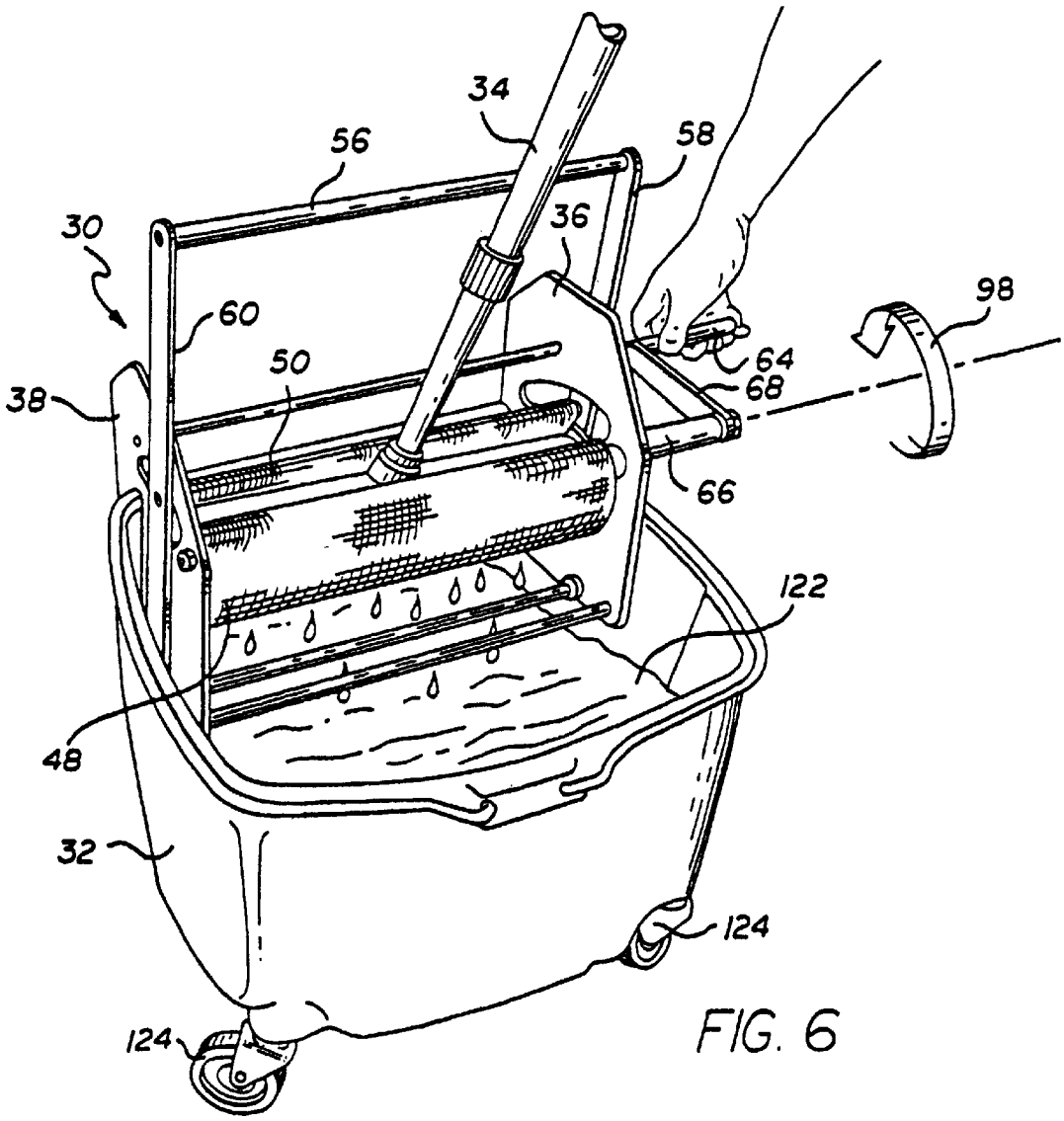
FIG. 6 is a front perspective view of the wringer of FIG. 1 in a closed position and wringing the head of a mop.

FIG. 2 shows how the lever and movable rods move during operation of wringer 30. The wringer has a fully open position 86 in Which the lever 54 is spaced a significant distance from crank shaft 66. The lever 54 pivots about lever pivot point 114, so that lever 54 may be rotated to a partially open position 88. Movable rod 50 (FIG. 1) moves along side plate slots 40, 42. Lever 54 can continue to the closed position 90, which may also be referred to as a wringing position, which may or may not have the opposite ends of the web in contact, depending on how much clearance is needed, if any, for accommodating the mop handle or other implement which may still extend outwardly between the rod SO and the crank shaft 66. In the closed position 90 shown in FIG. 2, movable rod 50 is substantially adjacent crank shaft 66. However, if a fairly thick item such as mop 34 and handle are inserted into the hanging flexible web 48 and the handle extends above both movable rod 50 and crank shaft 66, the movable rod and crank shaft may be spaced somewhat apart from each other even in the closed position 90, as illustrated in FIGS. 6 and 7.

Returning to FIGS. 1 and 2, crank 62 is rotationally mounted on side plates 36, 38 for clockwise rotation, as indicated by indicia 116. As will be explained in more detail below, the user wraps a portion of the flexible web 48 about the crank shaft 66 by rotating crank handle 64, thereby drawing the flexible web 48 upward and tightly about a wringable item when the wringer is in the wringing position 90.

Figure 3:
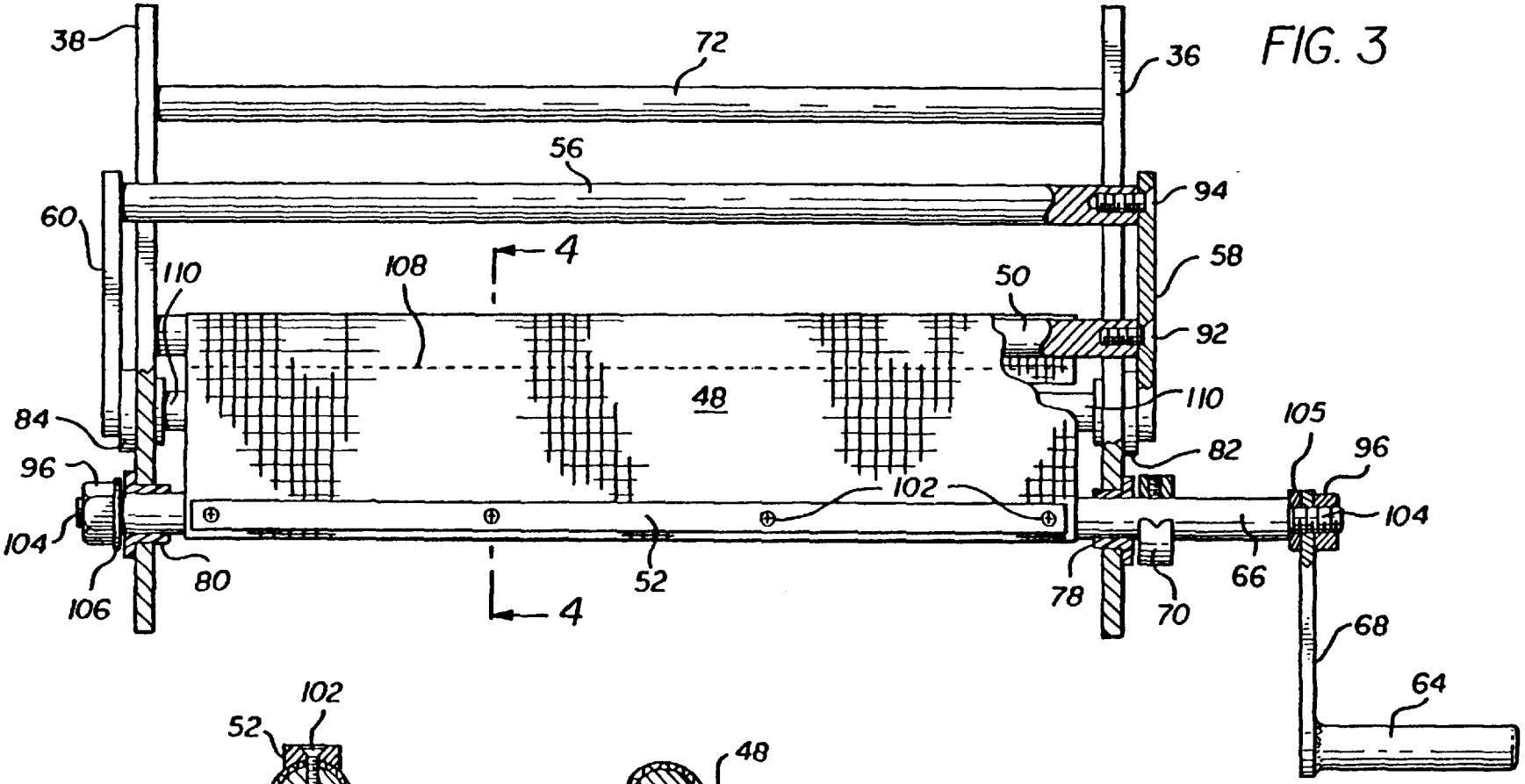
FIG. 3 is a top and partial cut-away view of the wringer of FIG. 1 looking down along Section 3—3 of FIG. 2.
Figure 5:
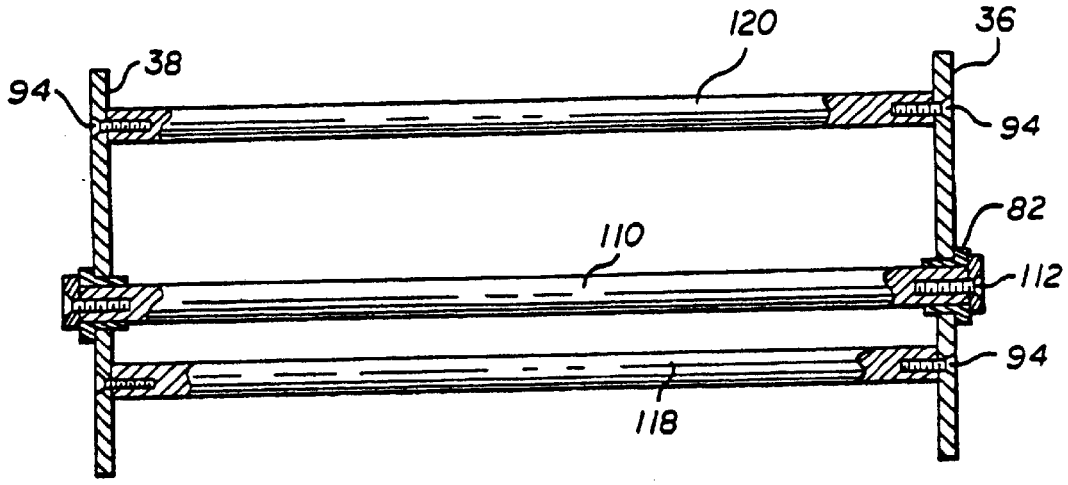
FIG. 5 is a horizontal cross sectional and partial cut away view taken along Section 5—5 of FIG. 2.

The wringer 30 includes various spacer rods, as can be seen in FIGS. 3 and 5, to form part of the frame. Spacer rod 72 is seen interposed in between and connected to side plates 36, 38.

Stainless steel first and second side plates 36, 38 are held in a spaced, substantially parallel relationship by upper spacer rod 72 and front and rear lower spacer rods 118 and 120. These rods are preferably internally threaded on both ends to receive screws 94, which connect the spacer rods to the first and second side plates 36, 38.

The side posts 58, 60 of the lever assembly are connected at their lower ends by screws 112 to a rotating lever bar 110 (FIG. 5), which extends through and between side plates 36, 38. The rotating lever bar 110 is supported at the side plates at each end by glass-filled "TEFLON" bushings 82, 84.

Rotating crank shaft 66 preferably includes threaded ends 104 (FIG. 3) for accommodating crank shaft nuts 96 on each end. A stainless steel collar 70 limits lateral movement of the crank shaft 66 relative to the side plates. The crank connecting bar 68 includes a threaded portion for mounting the crank handle on the crank shaft over threads 104 (FIG. 3). A bushing 105 spaces the crank connecting bar 68 from the adjacent end of the crank shaft 66 so that threading of the handle on the crank shaft positions the handle at a desired circumferential position on the crank shaft relative to the crank shaft. Nut 96 is then threaded onto the shaft to lock the crank handle in position. The bushing 105 can be replaced by bushings of different thicknesses so that the crank handle 64 can be positioned at different circumferential positions relative to the crank shaft 66. Alternatively, the handle end of the crank shaft 66 can be splined so that the handle can be selectively mounted at different circumferential positions on the crank shaft.

Circumferential positioning of the crank handle relative to the crank shaft is significant to obtain optimum wringing of a given item such as a mop head, wipes or the like. Typically, the wringer would be used with one type and configuration of wringable item, such as a string mop. The string mop would have a given size, which affects the amount of web 48 taken up by the crank shaft as the crank shaft is rotated. Rotation of the crank shaft, as a result, depends on the size and shape of the string mop. For a given size and shape, it is preferred to have the crank handle end up at a given arcuate position relative to the wringer and bucket so that the user can obtain maximum leverage while squeezing or wringing the mop. If the crank handle is not positioned at the desired position, given the size of the mop head and the preference of the user, the handle can be removed and repositioned at a different circumferential or arcuate location relative to the crank shaft to obtain the optimum wringing effect.

Figure 4:
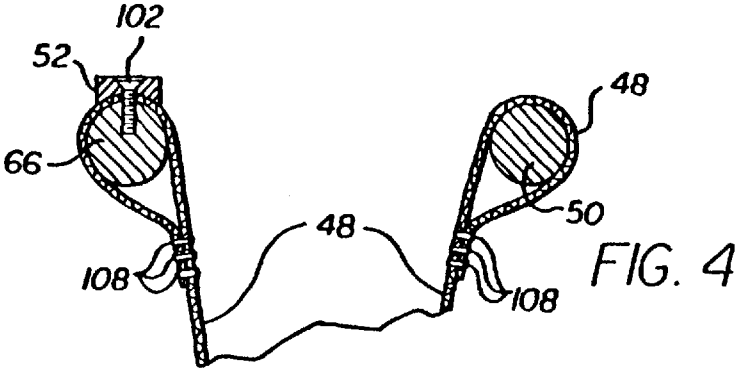
FIG. 4 is a sectional view of the wringer of FIG. 1 across a web, a movable bar, and a crank shaft showing how the web is positioned on the movable bar and the crank shaft.

Web 48 is fixedly attached at one end to crank shaft 66 by means of clamp bar 52 and clamp bar screws 102 which extend through apertures in clamp bar 52, through web 48 and into threaded openings in crank shaft 66, as seen in FIG. 4. The web 48 may be looped around crank shaft 66, with the loop being closed by means of stitch lines 108 and/or high strength glue. Web 48 is also looped about movable rod 50, as seen in FIG. 4. The loop may be closed by a stitch line 108 (FIGS. 3 and 4). Web 48 is fixedly attached to crank shaft 66 so that web 48 rolls up onto crank shaft 66 as the user rotates crank handle 64, thereby changing the configuration of the web to effect the desired wringing action.

FIGS. 6–9 illustrate ways in which the wringer 30 wrings a wringable item. FIGS. 6–8 illustrate the wringer 30 wringing the strings of a string mop 34. To wring the head of the mop 34, the user puts the mop down into the freely-hanging web 48 when the movable bar 50 is in a fully or partially open position. In FIG. 7, the movable bar is in a partially open position 88 and is represented by reference numeral 50'. Once the head of the mop 34 is inserted into the concave-shaped region defined by the freely-hanging web 48, the user moves movable bar 50 preferably as much as possible into a closed position 90 by pulling on lever handle bar 56. FIG. 7 shows movable rod 50 having been moved into the wringing position 90. The user then rotates the crank handle 64 in a clockwise direction, as shown in FIG. 8. The web 48 responds by rotating about crank shaft 66, as do the strings of the mop 126 pulled with the web. As the web 48 is drawn around crank shaft 66, the web pulls tight against mop strings 126, applying a substantially uniform wringing pressure to at least a major portion of the mop strings 126. Water and dirt particles are then squeezed out of mop strings 126, passing through the web 48 and down into the reservoir of cleaning solution 122 stored in bucket 32, as FIG. 6 shows.

The web 48 may wrap a greater or lesser degree about crank shaft 66 depending upon the size and shape of the wringable item which is placed in the wringer. For example, a very large bundle of strings from a string mop might make less than a complete turn about the crank shaft 66, whereas a relatively thinner string mop may make one or more complete revolutions about crank shaft 66, with strings 126 wrapping about each other in layers separated by portions of the web 48.

FIG. 9 illustrates a situation in which a sponge 128 has been placed in the wringer 30. The sponge may take any number of shapes and sizes, and all are preferably wrung out substantially to the same degree. In this case, as the user continues to crank handle 64 in a clockwise direction, the sponge 128 will shift up and about crank shaft 66. Depending on the size of sponge 128, the sponge may even continue wrapping back down in between crank shaft 66 and movable rod 50. The end result is that the web 48 will have been drawn tightly about sponge 128, thereby applying a strong and substantially uniform wringing pressure about at least a major portion of the sponge 128 and thoroughly wringing the sponge of cleaning solution.

To remove an object from the wringer 30 after wringing, the user may rotate the handle 64 in a counter clockwise direction to return the web to the initial wringing position 90 of FIG. 7. The user may then move the movable bar 50 into the partially open position 88 or the fully open position 86 by pulling on lever handle 56 to rotate lever side bars 58 and 60 out of the closed position. The user can then remove the wringable item, such as the head of mop 34, from the wringer. It may be noted that a wide variety of different wringable items may be wrung in the wringer 30, such as sponges, mop heads of various shapes and sizes, wipes, rags and even wet clothing in household applications, such as sweaters that have been washed by hand. Consequently, wringer 30 is truly a versatile wringer for a variety of wringable items and purposes, both for clean rooms and in other cleaning applications.

Figure 10:
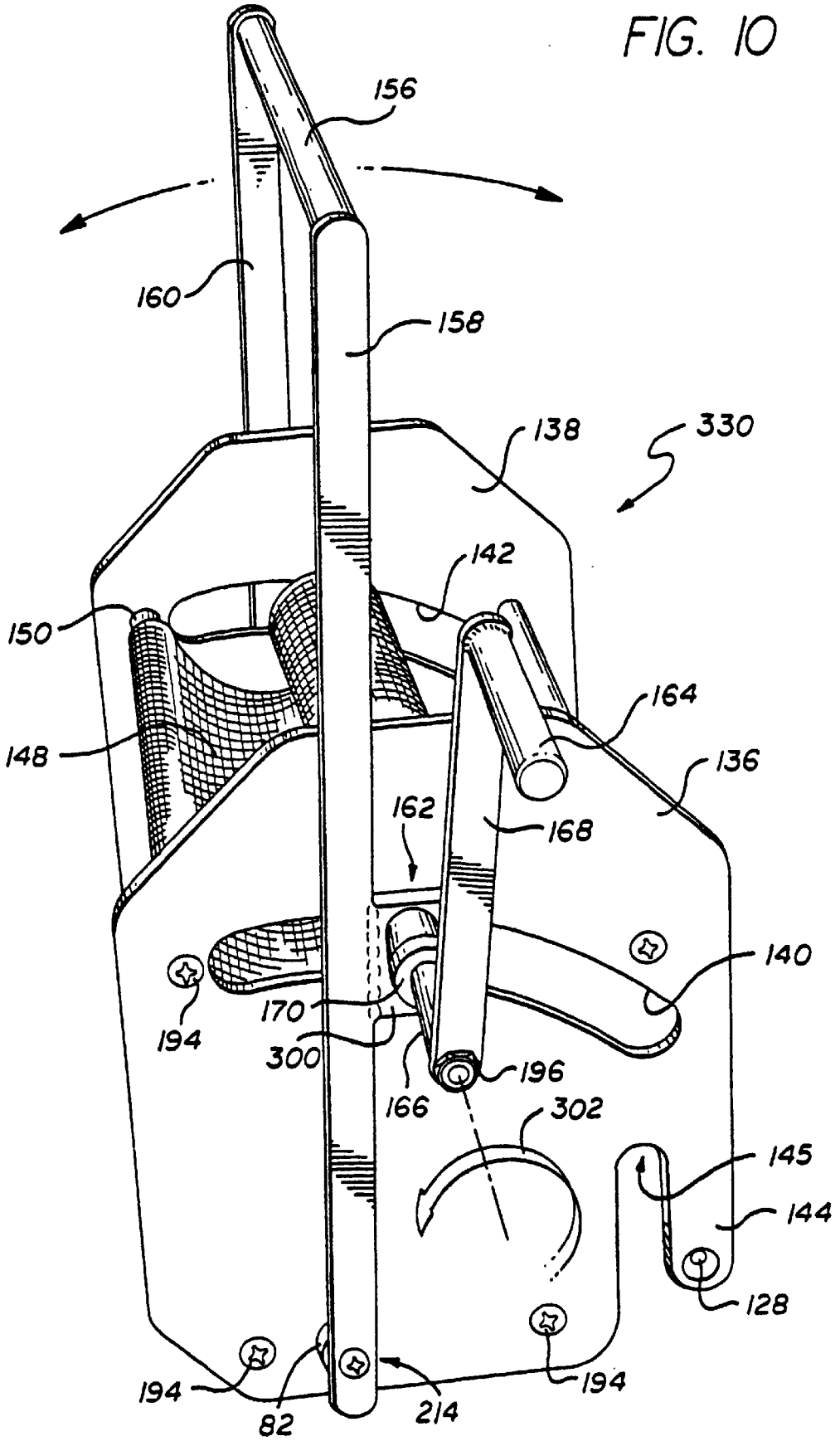
FIG. 10 is a side perspective view of an alternative embodiment of the present invention in which the crank moves or slides.

FIG. 10 illustrates an alternative embodiment of a wringer 330 in which the crank 162 moves along the slots 140, 142 and in which the rod 150 is fixed in place relative to the wringer frame. The reference numerals of FIG. 10 generally correspond to the reference numerals used previously with the addition of a 1, 2 or 3 in front of the previously used reference numeral. In this embodiment, the crank shaft 166 extends through an aperture (not shown) in an extension plate 300 which extends from lever side post 158. Crank shaft 166 extends through first side plate slot 140, then across the intermediate space defined by the side plates 136, 138, and ultimately through second side plate slot 142. Crank shaft 166 is supported by glass-filled "TEFLON" bushings (not shown) on the exterior sides of side plates 136, 138. For this embodiment, the preferred direction of rotation of crank handle 164 is the counter-clockwise direction 302, which corresponds to the reversal of orientation between the crank shaft 166 and the fixed rod 150.

It may also be noted that the embodiments described herein provide for easily replacing the web once it has worn out. With reference to FIG. 3, the user may pull crank shaft 66 out of the wringer by first unscrewing the screws 102 and removing nut 96 from the threaded far end of the crankshaft. The user may pull movable bar 50 free of the wringer after having unscrewed screws 92 from either end of the bar 50. The web then falls free of the wringer. A new web is installed by running the crank shaft 66 and the movable bar 50 through the respective end loops of the new web. The screws and nut are then rotated into place.

For purposes of illustration, but not of limitation, one embodiment of the present invention may have dimensions as follows. The side plates 36, 38 may be 9 inches wide at center and 11.5 inches high. Slots 40, 42 may be portions of a circle having a 7-inch radius centered at the respective lever pivot points. The slots 40, 42 may have front portions which begin at a distance of 3.625 inches below the top front of the side plates. The slots may terminate at a distance of 5.375 inches below the top rear of the side plates. The slots 40, 42 may have a width of 1.0 inch.

Crank connecting bar 68 may be 7.0 inches long, 0.75 inches wide and 0.375 deep. Crank handle 64 may be 4.0 inches long with a 0.625 inch diameter. Crank shaft 66 may be 16.5 inches long and 0.625 inch in diameter, with a threaded region extending 0.625 inches inwardly from one end.

Lever handle 56 may be 11.75 inches long with a 0.625 inch diameter. The side posts 58, 60 may have an aperture for pivotal mounting to the side plates, the aperture being centered at a distance of 1.0 inch from the very end of the lower portion of the side posts. The movable rod 50 may be attached to the side posts 58, 60 at a distance of 8.0 inches from the very end of the lower portion of the side posts. Consequently, the movable rod 50 follows the path of the slots 40,42 as lever 54 is rotated.

The spacer bars 72, 118, 120 may be 11.0 inches long and have a diameter of 0.5 inches, with female threaded screw shafts extending in 1.0 inch from either end. The movable rod 50 may be 11.75 inches long, with a 0.625 inch diameter. The rotating lever bar 110 may be 11.75 inches long and have a diameter of 0.625 inches, with threaded screw shafts extending in 1.0 inch from either end.

The "TEFLON" bushings 78, 80, 82, 84 may be 1.0 inch long, with a 1.0 inch exterior diameter at the exterior side of the side plates and a 0.875 inch exterior diameter passing through the side plates. The bushings may have a 0.630 inch inner diameter.

All of these dimensions are merely examples and may be varied to increase or decrease the maximum wringable item size. For instance, the spacer rods and rotating rods may be made substantially longer so that the wringer may accommodate wide mops. Likewise, the diameters of the various rods may be increased for extra-durability wringers.

As for materials, all of the components described, except for the web and the bushings, may be made of electropolished stainless steel numbers 302, 303 or 304. The bushings may be Delrin/Teflon or DelrinAF, available from the McMaster-Carr Supply Company, although other materials may be used. The bushings may be molded, or may be machined from bars of material.

The wringers of the described embodiments provide improved wringing structures which apply uniform pressure to a wide variety of shapes and sizes of wringable items, including mops, sponges, wipes, cloths, rollers and the like. The wringer is versatile, simple to make and use, has few moving parts and is easily serviced and maintained. The design minimizes the creation of particulates, and reduces any rubbing or shearing action on the wringable items as a result of the wringing action. The design for the wringer also allows it to be autoclaved without risk of harming the wringer, or producing contamination during subsequent use.

Figure 11:
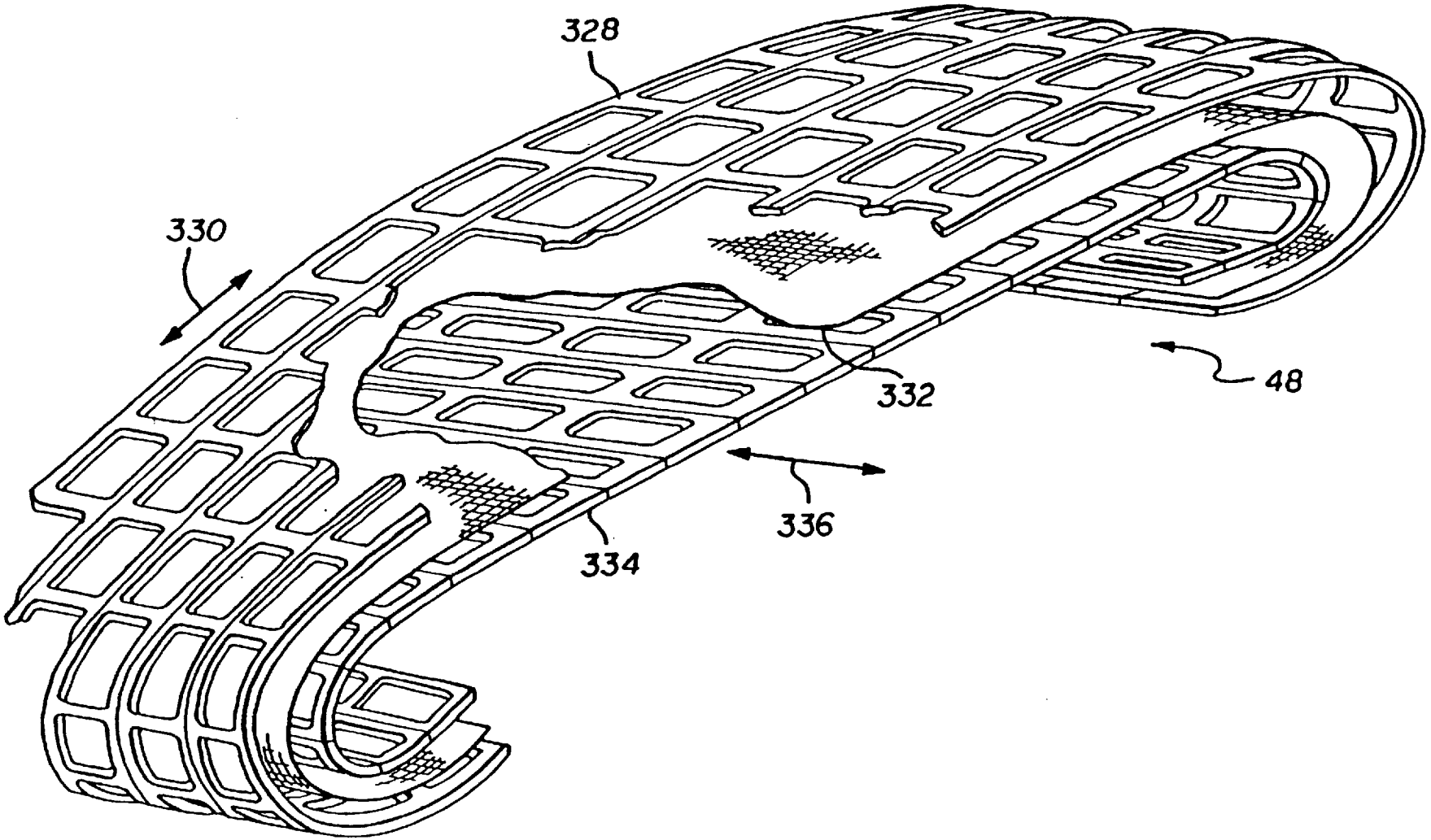
FIG. 11 is a perspective and partial cut-away view of a web having a first layer with a longitudinal stretch direction, a middle mesh layer, and a third layer with a latitudinal stretch direction.

In considering various aspects of the illustrated embodiments, it may be noted that the web 48 should be designed to minimize stretching during use. One approach is to make a web having three layers of material (FIG. 11). The first layer 328 may be a polyester net having openings which are oriented in a first direction, such that the first layer has a longitudinal stretch direction 330. The middle layer 332 may be a relatively fine polyester mesh through which fluids and particles of contaminant may easily flow. The third layer 334 may be a polyester net the same as or similar to the first layer, with the knit openings having an orientation that is 90 degrees rotated from that of the first layer and with a latitudinal stretch direction 336. The differing orientations of the knit helps prevent stretching of the web assembly in both the lateral and longitudinal directions.

The web material is preferably formed from an assembly of lint-free polyester material in three layers. The two outer layers 328, 334 are formed from a net of 100% polyester material designated TA74 from Apex Mills Corporation, sandwiching a middle knit layer 332 of 100% polyester material designated with the Item ND27, also from Apex Mills. The two outer layers are orientated with the stretch direction of each layer oriented 90° from that of the opposite layer to minimize any stretch in the entire assembly once in place. The outer layers are formed as a net material with large holes, but both materials are liquid and particle permeable. The assembled materials provide a suitable tensile strength for the wringer. However, variations of different fabric combinations and configurations can be used to suit the intended materials to be wrung, and the applications. The web material is preferably chemically inert to cleaning solutions, highly flexible, withstanding continuous flexing and tension without breakage or damage, and capable of being sewn or heat sealed to join together portions of the web to form a loop.

The preferred embodiments provide a wringer that requires no lubrication, such as oils or greases, and has no metal-to-metal contact of moving parts. The wringer has a simple mechanical construction without complicated gears or spring mechanisms. The wringer material conforms to the shape of the item being wrung, and extracts more liquid compared to presently available commercial gear press wringers. The mechanical wringing force is distributed uniformly over the material being wrung by the flexible wringer material, as opposed to concentrating the mechanical force only on certain parts of the items to be wrung. The wringer fits on standard cleaning buckets, but can be easily made wider or narrower by changing the lengths of the support bars. The open bottom construction on the frame of the wringer simplifies cleaning and prevents dirt or other particles from collecting on the wringer. Therefore, the wringer of the present invention provides substantial improvements over preexisting wringers.

In conclusion, it is to be understood that the foregoing detailed description and the accompanying drawings related to preferred embodiments of the invention. Various changes and modifications may be made without departing from the spirit and scope of the invention. Thus, by way of example and not of limitation, the crank shaft may have a slotted or clothes-pin configuration having two parallel prongs, a slot in between the prongs, and an open end. The web 48 is looped about the first prong, but not the second, so that when the crank shaft is fully mounted on the wringer, the web 48 is attached to the crank shaft. As the slotted crankshaft rotates, the second prong causes the web to wrap about the crankshaft.

Other variations to the preferred embodiment may be employed. One of the bucket clamping systems known in the art may replace or supplement the mount system illustrated in FIG. 1. A take-up spool may be mounted on the crank shaft to reduce the number of rotations of the handle required to take up the web. The movable bar may be moved by means other than lever 54. For instance, levers having only one side post may be employed, as may bars and/or handles extending directly from the movable bar itself. Tracks mounted on the interior of the side plates may guide the movable bar rather than side plate slots. The unit may even be motorized for automated movement of the movable bar or rotation of the crank. Additionally, both the bar and the crank unit may be made to move, with neither of them fixed in a particular position, in particular embodiments.

Movable bar 50 normally moves within the side plate slots without touching either edge of the slots so as not to allow metal-to-metal contact that could create metal particles. However, in one particular alternative embodiment, the side plate slots are provided with a "TEFLON" coating and movable bar slides along the "TEFLON"-coated edge of the slot.

The crank connecting bar may be attached to the crank shaft in a variety of ways. For instance, it may be advantageous to provide a male spline on the crank end of the crank shaft, with a mating female spline pattern on the end of the crank connecting bar. The user would then be able to easily change the position of the handle for maximum mechanical advantage in squeezing the wringable item. Thus, if the handle were positioned at six o'clock, but the user wanted to move the handle for additional leverage at the crank position of maximum pressure, the user could take the crank connecting bar off of the crank shaft, rotate the crank handle to three o'clock, then reattach the crank connecting bar in its new position. The user could then apply force to the crank handle more easily.

Materials other than stainless steel may be used, preferably so the materials do not rust or otherwise degrade when repeatedly exposed to water for cleaning solutions. In embodiments which are to be autoclavable, the materials should be chosen to withstand the high heat and the humidity environment of an autoclave.

The web may be clamped to the movable bar as well as to the crank shaft so that the web does not bunch up laterally on the movable bar.

Accordingly, the present invention is not limited to the specific embodiment shown in the drawings and described in the detailed description.

What is claimed is:

1. An adjustable wringer for use in cleaning clean rooms which can wring a variety of different types and sizes of mops, wipes, sponges and other wringable items, the wringer comprising:

first and second side plates, said first and second side plates being situated in a spaced relationship relative to one another, said first and second side plates each having a transverse slot;

a lever comprising:

a) a handle having first and second handle side posts, each side post having an upper end and a lower end, said first post being rotatably mounted at its lower end to said first side plate and said second post being rotatably mounted at its lower end to said second side plate, said handle further comprising a handle bar which is interposed in between and connected to said upper ends of said first and second side posts; and b) a rod attached at one end to said first side post and attached at its other end to said second side post, with one end of said rod passing through said slot of said first side plate and the other end of said rod passing through said slot of said second side plate;

a crank having a crank handle and a rotatable crank shaft, said crank shaft extending from said first plate to said second plate; and a substantially lint-free, flexible web which is attached at one end to said rod and which is attached at its other end to said crank shaft;

wherein said wringer has an open position in which said rod is spaced a distance from said crank shaft and in which a user may place a wringable item of a variety of different dimensions onto said web from above, and a closed position in which said rod is substantially adjacent to said crankshaft and in which the flexible web substantially envelopes the wringable item, said lever being movable from said open to said closed position;

whereby the user may rotate the crank handle in said closed position to tighten the flexible web about the wringable item, thereby wringing the item.

2. An adjustable wringer for use in cleaning clean rooms as defined in claim 1 wherein said first and second side plates each include a bucket mount.

3. An adjustable wringer for use in cleaning clean rooms as defined in clam 1 wherein said wringer further comprises at least one sleeve bearing, said at least one sleeve bearing at least partially supporting said crankshaft and comprising polytetrafluoroethylene.

4. An adjustable wringer for use in cleaning clean rooms as defined in claim 1 wherein said side plates, said handle bar, said first and second handle side posts, and said crankshaft are made of stainless steel.

5. An adjustable wringer for use in cleaning clean rooms as defined in claim 1 wherein said flexible web is made of polyester.

6. An adjustable wringer for use in cleaning clean rooms as defined in claim 1 wherein said first side plate further comprises indicia indicating which direction to turn said crank handle for wringing the wringable item.

7. An adjustable wringer for use in cleaning clean rooms as defined in claim 1 wherein said wringer is substantially free of grease and lubricating oil.

8. An adjustable wringer for wringing a variety of different types and sizes of mops, wipes, sponges and other wringable items, the wringer comprising:

first and second side supports, said first and second side supports being situated in a spaced relationship relative to one another, said first and second side supports each having a slot;

a movable bar, with one end of said bar passing through said slot of said first side support and the other end of said bar passing through said slot of said second side support;

a crank having a crank handle and a rotatable crank shaft, said crank shaft extending from said first side support to said second side support;

a flexible web which is attached at one end to said bar and which is attached at its other end to said crank shaft;

wherein said wringer has a loading position in which said bar is spaced a distance from said crank shaft and in which a user may place a wringable item of any of a variety of different dimensions onto said flexible web, and a wringing position in which said bar is relatively closer to said crank shaft and in which the flexible web substantially envelopes the wringable item, said movable bar being movable along said slots from said loading position to said wringing position;

whereby the user may rotate the crank handle in said wringing position to tighten the flexible web about the wringable item, thereby wringing the item.

9. An adjustable wringer as defined in claim 8 wherein said wringable item may be loaded onto said flexible web from above.

10. An adjustable wringer as defined in claim 8, wherein:

said wringer further comprises a handle having a handle side post, said side post having an upper end and a lower end, said post being rotatably mounted at its lower end to said first side support, said handle further comprising a handle bar which is connected to said side post; and said movable bar is connected to said handle.

11. An adjustable wringer as defined in claim 8 wherein said first and second side supports each include a bucket mount.

12. An adjustable wringer as defined in claim 8 wherein said wringer comprises at least one moving part, said wringer further comprising at least one low-friction surface adjacent to said at least one moving part, wherein said wringer is substantially free of grease and lubricating oil.

13. An adjustable wringer as defined in claim 8 wherein said crank is also movable relative to said movable bar.

14. A wringer for [mops, wipes, sponges and other] wringable items, the wringer comprising:

a wringer frame having a *first* member;

a wringing element having a [crank] *rotatable element* which is supported by said wringer frame, such that said *first* member and said [crank] *rotatable element* can be spaced apart; and a flexible web having [ends] *end portions*, said web being [attached] *supported* at one end [to] *portion by* said [crank] *rotatable element such that rotation of the rotatable element wraps at least part of the web about the rotatable element,* and being [attached] *supported* at another end [to] *portion by* said *first* member of said wringer frame;

wherein at least one of said *first* member and said [crank] *rotatable element* is a movable element which is movable relative to the other, said wringer having a closer position in which said [crank] *rotatable element* and said *first* member are relatively closer to one another and a farther position in which said [crank] *rotatable element* and said *first* member are relatively farther from each other;

whereby a user may rotate said [crank] *rotatable element* in said closer position to wring [the] *a* wringable item.

15. A wringer as defined in claim 14 wherein said *first* member is [said] *a* movable element and [said] *wherein the rotatable element is a* crank [is] fixed in position relative to said frame.

16. A wringer as defined in claim 14 wherein *the rotatable element is a crank and wherein* said crank is said movable element and said *first* member is fixed in position relative to said frame.

17. A wringer [as defined in claim 14 wherein said wringer further comprises] *for mops, wipes, sponges and other wringable items, the wringer comprising:*

*a wringer frame having a first member;*

*a wringing element having a crank which is supported by said wringer frame, such that said first member and said crank can be spaced apart;*

*a flexible web having ends, said web being attached at one end to said crank and being attached at another end to said first member of said wringer frame; and* first and second side supports, at least one of said first and second side supports having a slot*;*

*wherein at least one of said first member and said crank is a movable element which is movable relative to the other, said wringer having a closer position in which said crank and said first member are relatively closer to one another and a farther position in which said crank and said first member are relatively farther from each other;*

*whereby a user may rotate said crank in said closer position to wring the wringable item.*

18. A wringer as defined in claim 17 wherein said movable element comprises a bar having an end portion, at least some of said end portion being disposed in said at least one slot.

19. An adjustable wringer as defined in claim 18, wherein:

said wringer further comprises a lever having a lever side post, said side post having an upper end and a lower end, said post being rotatibly mounted at its lower end to said fast side support, said lever further comprising a handle bar which is connected to said side post;

said movable element is connected to said handle bar; and a portion of said movable element is disposed in said at least one slot.

20. An adjustable wringer as defined in claim 14 *wherein said rotatable element is a crank,* wherein said farther position comprises a loading mode in which said *first* member and said crank are spaced a distance from one another and in which a user may place a wringable item of any of a variety of different dimensions onto said flexible web, and wherein said wringer has a wringing mode in said closer position in which the flexible web substantially envelopes and applies substantially uniform pressure about the wringable item, said movable element being movable from said loading position to said wringing position.

21. An adjustable wringer [as defined in claim 20] *for mops, wipes, sponges and other wringable items, the wringer comprising:*

*a wringer frame having a first member;*

*a wringing element having a crank which is supported by said wringer frame, such that said first member and said crank can be spaced apart; and*

*a flexible web having ends, said web being attached at one end to said crank and being attached at another end to said first member of said wringer frame;*

*wherein at least one of said first member and said crank is a movable element which is movable relative to the other, said wringer having a closer position in which said crank and said first member are relatively closer to one another and a farther position in which said crank and said first member are relatively farther from each other;*

*whereby a user may rotate said crank in said closer position to wring the wringable item;*

*wherein said farther position comprises a loading mode in which said first member and said crank are spaced a distance from one another and in which a user may place a wringable item of any of a variety of different dimensions onto said flexible web, and wherein said wringer has a wringing mode in said closer position in which the flexible web substantially envelopes and applies substantially uniform pressure about the wringable item, said movable element being movable from said loading position to said wringing position;* in which said wringer in said loading mode [has] *defines* a space having edges, said space being defined along one edge by said crank and being defined along an opposing edge by said *first* member, said space being substantially continuous in between said crank and said *first* member such that wringable items of various sizes may be individually loaded onto said flexible web following a path that traverses said space and which passes in between said crank and said *first* member.

22. An adjustable wringer as defined in claim 14 wherein said wringer comprises at least one moving part, said wringer further comprising at least one low-friction surface which is in contact with said at least one moving part, and wherein said wringer is substantially free of grease and lubricating oil.

23. An adjustable wringer for wringing a variety of different types and sizes of mops, wipes, sponges and other wringable items comprising:

a wringer frame having a first member and a second member*, one of the first and second members having an axis of rotation*; and a flexible web having ends and a surface, said flexible web being attached at an end to said first member and being attached at another end to said second member*, one of said ends being attached longitudinally along one of said members and parallel to an axis of rotation of said one of said members*;

wherein said wringer has a first mode in which a wringable item may be loaded onto said surface of said flexible web in between said first member and said second member, and a second mode in which said flexible web substantially envelopes and applies substantially uniform pressure about at least a major portion of the wringable item.

24. An adjustable wringer as defined in claim 23 wherein said wringer comprises at least one moving part, said wringer further comprising at least one low-friction surface which is immediately adjacent to said at least one moving part, said wringer being substantially free of grease and lubricating oil.

25. A wringer as defined in claim 23 wherein said first member is movable relative to said second member and said second member is fixed in position relative to said frame.

26. A wringer as defined in claim 25 wherein said first member is a moveable rod and said second member is a crank.

27. [A] *An adjustable* wringer [as defined in claim 26,] *for wringing a variety of different types and sizes of mops, wipes, sponges and other wringable items comprising:*

*a wringer frame having a first member and a second member; and*

*a flexible web having ends and a surface, said flexible web being attached at an end to said first member and being attached at another end to said second member;*

*wherein said wringer has a first mode in which a wringable item may be loaded onto said surface of said flexible web in between said first member and said second member, and a second mode in which said flexible web substantially envelopes and applies substantially uniform pressure about at least a major portion of the wringable item;*

*wherein said first member is movable relative to said second member and said second member is fixed in position relative to said frame;*

*wherein said first member is a movable rod and said second member is a crank;* wherein said frame includes a slot which defines a path of motion, a portion of said first member being engaged in said slot such that said first member may move along said path of motion.

28. A wringer as defined in claim 23 wherein said first member is a crank and said second member is a rod.

*29. The wringer of claim 14 wherein the web is attached at one end portion to the rotatable element and at another end portion to the first member.*

*30. The wringer of claim 14 wherein said rotatable element is part of a crank, wherein said closer position has said crank and said first member relatively closer to one another and wherein said farther position has said crank and said first member relatively farther from each other whereby a user may rotate said crank in said closer position to wring the wringable item.*

*31. The wringer of claim 30 wherein the movable element includes a handle for moving the movable element between the closer and farther positions.*

*32. The wringer of claim 31 wherein the movable element is different from the rotatable element and wherein the rotatable element is mounted to the wringer frame to permit rotation relative to the frame.*

*33. The wringer of claim 32 wherein rotation of the rotatable element changes the length of the web.*

*34. The wringer of claim 30 wherein movement of the movable element does not result in the length of the web changing.*

*35. The wringer of claim 14 wherein the web has a length between the end portions and wherein rotation of the rotatable element changes the length of the web that extends between the rotatable element and the first member.*

*36. A wringer for mops, wipes, sponges and other wringable items, the wringer comprising:*

*a wringer frame having a first member;*

*a wringing element having a crank which is supported by said wringer frame, such that said first member and said crank can be spaced apart; and*

*a flexible web having ends, said web being supported at one end by said crank and being supported at another end by said first member of said wringer frame, one of said ends being attached longitudinally along one of said crank and said first member and parallel thereto;*

*wherein at least one of said first member and said crank is a movable element which is movable relative to the other, said wringer having a closer position in which said crank and said first member are relatively closer to one another and a farther position in which said crank and said first member are relatively farther from each other;*

*whereby a user may rotate said crank in said closer position to wring the wringable item.*

*37. A wringer as defined in claim 36 wherein said first member is said movable element and said crank is fixed in position relative to said frame.*

*38. A wringer as defined in claim 36 wherein said crank is said movable element and said first member is fixed in position relative to said frame.*

*39. A wringer as defined in claim 36 wherein said wringer further comprises first and second side supports, at least one of said first and second side supports having a slot.*

*40. A wringer as defined in claim 39 wherein said movable element comprises a bar having an end portion, at least some said end portion being disposed in said at least one slot.*

*41. An adjustable wringer as defined in claim 40, wherein:*

*said wringer further comprises a handle having a handle side post, said side post having an upper end and a lower end, said post being rotatably mounted at its lower end to said first side support, said handle further comprising a handle bar which is connected to said side post;*

*said movable member is connected to said handle; and*

*a portion of said movable member is disposed in the slot.*

*42. An adjustable wringer as defined in claim 36 wherein said farther position comprises a loading mode in which said first member and said crank are spaced a distance from one another and in which a user may place a wringable item of any of a variety of different dimensions onto said flexible web, and wherein said wringer has a wringing mode in said closer position in which the flexible web substantially envelopes and applies pressure to the wringable item, said movable member being movable from said loading position to said wringing position.*

*43. An adjustable wringer as defined in claim 42 in which said wringer in said loading mode defines a space having edges, said space being defined along one edge by said crank and being defined along an opposing edge by said first member, said space being substantially continuous in between said crank and said first member such that wringable items of various sizes may be individually loaded onto said flexible web following a path that traverses said space and which passes in between said crank and said member.*

*44. An adjustable wringer as defined in claim 36 wherein said wringer comprises at least one moving part, said wringer further comprising at least one low friction surface which is in contact with said moving part, wherein said wringer is substantially free of grease and lubricating oil.*

*45. A wringer for mops, wipes, sponges and other wringable items, the wringer comprising:*

*a wringer frame;*

*a first member supported by the frame;*

*a wringing element having a rotatable element which is supported by said wringer frame, such that said first member and said rotatable element can be spaced apart and movable toward and away from each other; and*

*a flexible web having ends, said web being attached at one end to said rotatable element and being attached at another end to said first member of said wringer frame, one of said ends being attached longitudinally along one of said rotatable element and said first member and parallel thereto.*

*46. The wringer of claim 45 wherein the first member extends longitudinally in a first direction and wherein the wringing element extends at least partly in the first direction and wherein the flexible web extends between the first member and the wringing element.*

*47. The wringer of claim 46 wherein rotation of the rotatable element wraps the web around the rotatable element.*

*48. The wringer of claim 45 wherein the first member and the rotatable element extend longitudinally side-by-side and are oriented parallel to each other.*

*49. A method of wringing items, the method comprising:*

*positioning a wringer having a first member, a rotatable wringing element and a flexible web supported by the first member and by the rotatable wringing element such that rotation of the rotatable element wraps at least part of the web about the rotatable element;*

*placing a wringable element on the web and rotating the rotatable element so that part of the web wraps around the rotatable element while the web is still supported by the first member; and*

*moving the rotatable wringing element and the first member closer together.*

*50. The method of claim 49 further comprising the step of placing the first member and the rotatable wringing element relatively closer together using a handle.*

* * * * *

UNITED STATES PATENT AND TRADEMARK OFFICE

CERTIFICATE OF CORRECTION

PATENT NO. : Re. 36,599
DATED : March 7, 2000
INVENTOR(S) : Joselito De Guzman

It is certified that error appears in the above-identified patent and that said Letters Patent is hereby corrected as shown below:

Claim 3, line 2, change " clam 1 " to

-- claim 1 -- .

Claim 19, line 4, change " rotatibly " to

-- rotatably -- .

Claim 19, line 5, change " fast " to

-- first -- .

Signed and Sealed this

Fifteenth Day of May, 2001

Nicholas P. Godici

*Attest:*

NICHOLAS P. GODICI

*Attesting Officer*

*Acting Director of the United States Patent and Trademark Office*